United States Patent [19]

Pherigo et al.

[11] Patent Number: 5,586,393
[45] Date of Patent: Dec. 24, 1996

[54] HEADLAMP LEVEL INDICATOR

[75] Inventors: Douglas E. Pherigo, Loves Park; Leo B. Jansen, Rockford, both of Ill.

[73] Assignee: Textron Inc., Providence, R.I.

[21] Appl. No.: 359,399

[22] Filed: Dec. 20, 1994

[51] Int. Cl.$^6$ .............................. G01C 9/10; B60Q 1/00
[52] U.S. Cl. .............................. 33/288; 33/335; 33/391; 362/61
[58] Field of Search .......................... 33/288, 335, 365, 33/391; 362/61, 419

[56] References Cited

U.S. PATENT DOCUMENTS

| | | | |
|---|---|---|---|
| 685,569 | 10/1901 | Bullard | 33/365 |
| 1,955,488 | 4/1934 | Crane et al. | 33/365 |
| 2,205,544 | 6/1940 | Rylsky | 33/365 |
| 2,357,817 | 9/1944 | Foster | 33/365 |
| 4,660,128 | 4/1987 | Bergin et al. | 362/61 |
| 5,042,158 | 8/1991 | Schmelzer | 33/391 |
| 5,055,980 | 10/1991 | Mochizuki | 33/288 |
| 5,083,244 | 1/1992 | Shirai et al. | 362/61 |
| 5,107,407 | 4/1992 | Collot et al. | 362/61 |
| 5,140,503 | 8/1992 | Lisak | 33/288 |

*Primary Examiner*—Christopher W. Fulton
*Attorney, Agent, or Firm*—Trexler, Bushnell, Giangiorgi & Blackstone, Ltd.

[57] ABSTRACT

In accordance with the present invention, a headlamp beam alignment indicating and calibrating device includes a roller element arranged for rolling movement relative to a guide structure, and an indicator for indicating displacement of the roller member resulting from the rolling movement thereof relative to the guide structure. The guide structure is secured to the adjustable beam alignment portion of the headlamp for movement therewith so that any motion of the beam alignment structure results in movement of the guide structure indicated by a relative displacement of the roller element. In a preferred embodiment, the guide structure is an elongate track which is mounted on an adjustable beam alignment reflector wall of the headlamp. The movement of the reflector wall causes the coupled track to move and induce gravitational rolling of a ball in apparent relative displacement along the guide track.

5 Claims, 2 Drawing Sheets

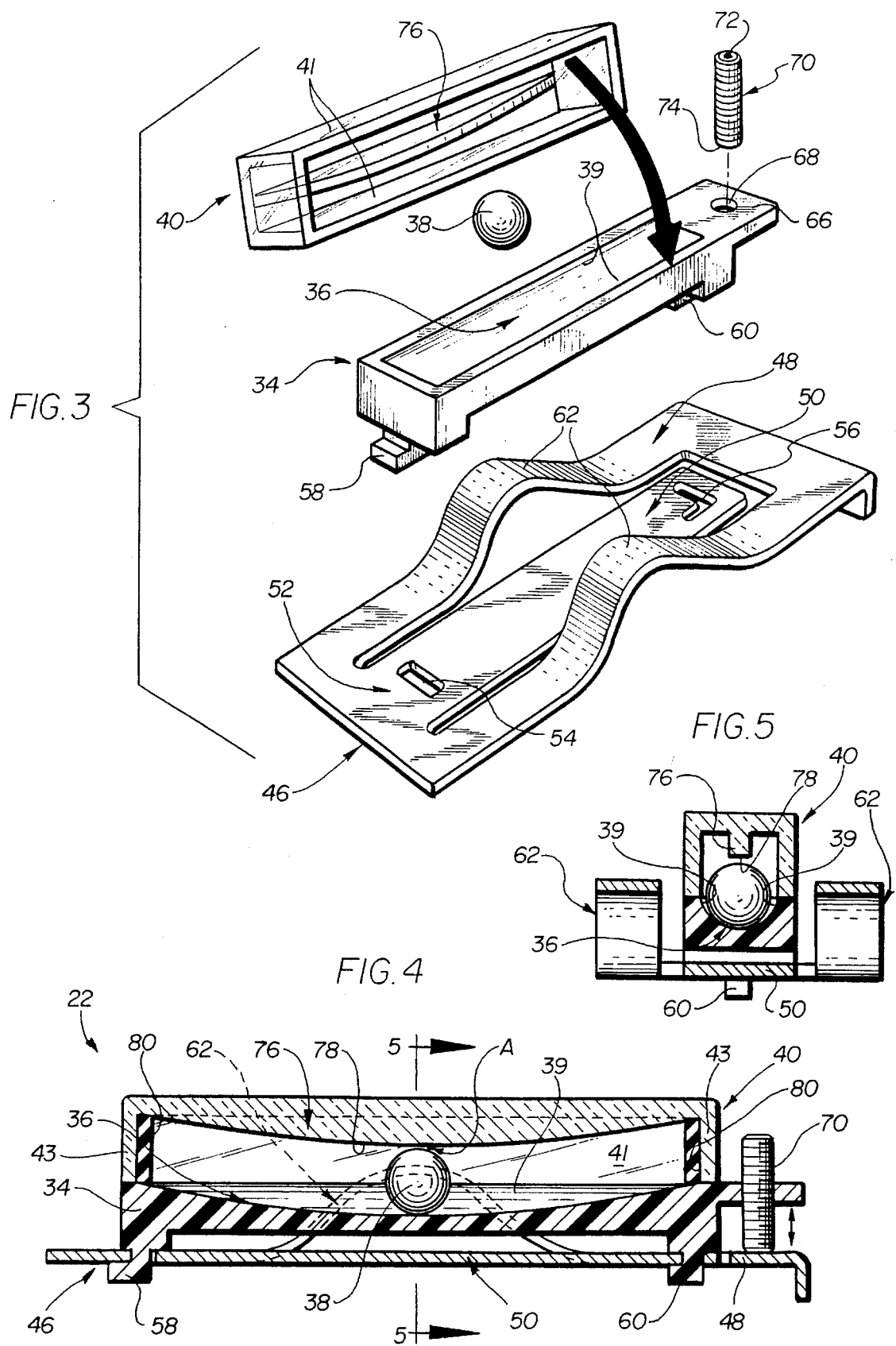

5,586,393

HEADLAMP LEVEL INDICATOR

BACKGROUND OF THE INVENTION

The present invention relates to vehicle headlamp alignment devices, and particularly relates to indicating and calibrating devices for calibrating and correcting misalignment of the headlamp.

Modern automotive headlamp adjustment assemblies include calibration gauges mounted in the headlamp assembly to provide visual indicator corresponding to the headlamp alignment and monitor of subsequent misalignment resulting from jarring or vibration by the vehicle. Typically, vertical headlamp alignment calibration assemblies have been developed, for example as described in U.S. Pat. Nos. 5,121,303 (Shirai), 5,140,503 (Lisak) and 5,186,531 (Ryder et al.). More recently, headlamp leveling and calibration devices have been improved, for example as described in U.S. Pat. Nos. 5,140,503 (Lisak) and 5,317,486 (Schmitt) in which a level indicating device such as a bubble-type or "spirit" level is provided in a form which can be easily installed on a vehicle headlamp assembly during manufacture. The headlamp is adjusted to a desired position by the automobile manufacturer using specially designed calibrating devices to assure that the headlamps are aimed properly. The level indicating device is then adjusted relative to the headlamp during calibration to indicate a level or "zero" position for the headlamp. The spirit level will reflect any subsequent vertical misalignment of the headlamp and confirm readjustment of the headlamp alignment corresponding to the calibrated or "zero" position of the spirit level. The spirit levels employed in these patented assemblies employ mineral spirits with consequent fluid handling and disposal hazards. These disadvantages are eliminated by the headlamp alignment indicator and calibrating devices in accordance with the present invention.

SUMMARY OF THE INVENTION

In accordance with the present invention, a headlamp beam alignment indicating and calibrating device includes a roller element arranged for rolling movement relative to a guide structure, and an indicator for indicating displacement of the roller member resulting from the rolling movement thereof relative to the guide structure. The guide structure is secured to the adjustable beam alignment portion of the headlamp for movement therewith so that any motion of the beam alignment structure results in movement of the guide structure indicated by a relative displacement of the roller element.

In a preferred embodiment, the guide structure is an elongate track which is mounted on an adjustable beam alignment reflector wall of the headlamp. The movement of the reflector wall causes the coupled track to move and induce gravitational rolling of a ball in apparent relative displacement along the guide track. The guide track has a concavely curved support surface along which the ball rotates and an overlying cover surface which is correspondingly curved and relatively spaced from the support surface for the rolling movement of the ball therebetween with narrow clearance. The narrow clearance of the ball from the overlying curved surface suppresses any rattling during transient engagement of the ball against the overlying surface, due for example to operating vibration from the vehicle.

BRIEF DESCRIPTION OF THE DRAWINGS

FIG. 3 is an exploded perspective view of the indicating and calibrating device of FIGS. 1 and 2;

FIG. 4 is a longitudinal sectional view of the device as shown in FIG. 3; and

FIG. 5 is a sectional view taken along a plane indicated by line 5—5 in FIG. 4.

DETAILED DESCRIPTION OF THE ILLUSTRATED EMBODIMENT

Figure 1:
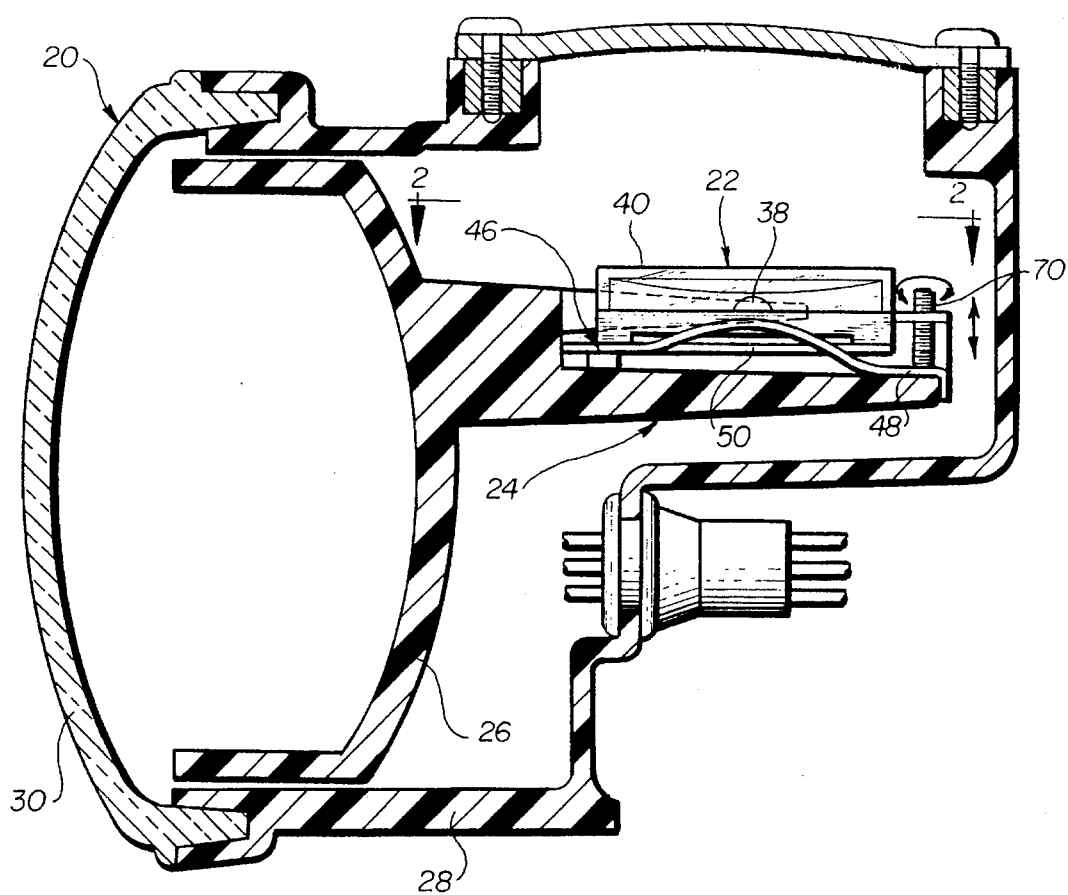
FIG. 1 is a vertical, sectional view through an automotive headlamp assembly on which is mounted and alignment indicating and calibrating device in accordance with the present invention.
Figure 2:
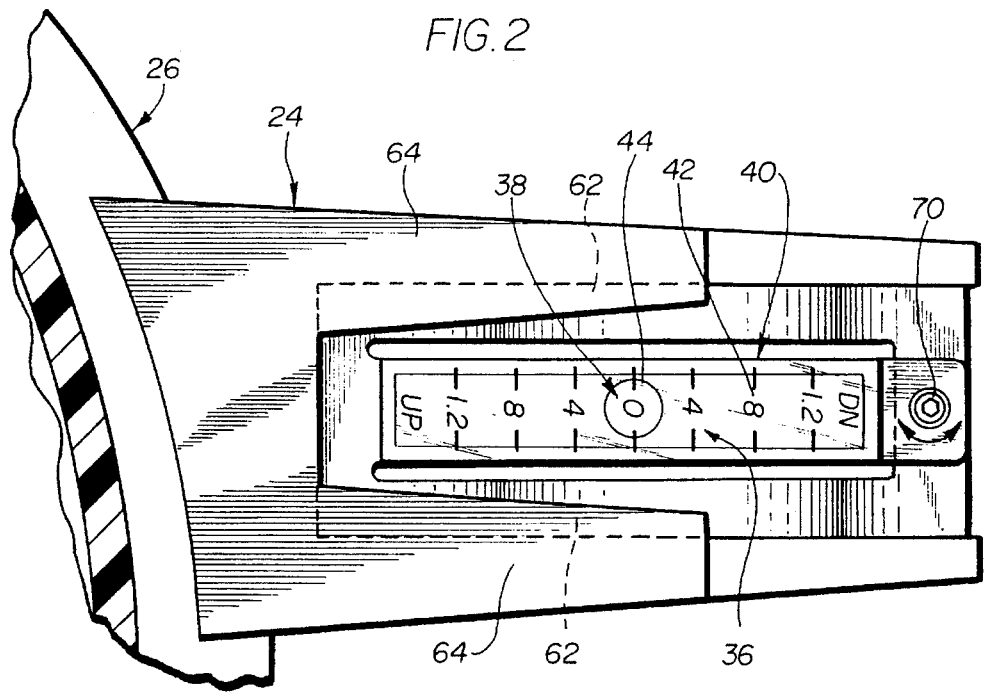
FIG. 2 is a fragmentary, sectional view generally taken along a plane indicated by line 2—2 in FIG. 1.

Referring initially to FIGS. 1 and 2, a simplified, diagrammatic headlamp assembly is illustrated and generally designated by reference character 20 and mounted thereon is one embodiment of a beam-aiming indicator and calibration assembly 22 in accordance with the present invention. In the illustrated embodiment, the indicated device 22 is mounted on a bracket 24 integrally formed with an internal reflector member 26 of headlamp 20 within the external housing or shell portion 28 and front lens 30. The reflector 26 is typically adjustable in vertical and horizontal orientations by separate adjusting mechanisms (which have not been shown for simplification) and may be any one of numerous mechanisms known in the art or for example as fully described in the aforementioned U.S. Pat. No. 5,317,486, the entire disclosure of which is incorporated herein by reference.

In the illustrated embodiment, a transparent window panel 32 is secured on the headlamp housing wall 28 and arranged to enable an exterior view of the indicating and calibrating device 22.

Referring now to FIGS. 2–5, the aim indicator and calibrating device 22 has a two-part housing in which the lower housing portion 34 is molded to form an elongate, compoundly curved track 36 upon which a spherical roller member 38 is freely rollable and enclosed by curved side walls 39 and the upper housing portion 40. The upper housing portion 40 also includes side walls 41 which are aligned with the upper edges of the side walls 39. Housing portions 34 and 40 can be assembled by snap-fit, with or without a gasket, or could be welded or bonded together. The upper housing portion 40 is preferably molded from transparent plastic with the molded series of indicator lines or graduations 42 including a medial calibration indicia or "Zero" line 44 representing the proper vertically levelled alignment of the headlamp. The displacement of the rolling sphere from the Zero indicia 44 along track 36 is metered by the indicator lines 42. Accordingly, when the headlamp orientation is originally adjusted into the desired alignment according to prescribed specification, as more fully described hereinafter, the device 22 is operated as discussed hereinafter to cause the ball 38 to be adjusted into calibrated alignment with the Zero indicator 44 as shown in FIG. 2. Horizontal beam-alignment indicia can also be incorporated, for example, as described in the aforementioned U.S. Pat. No. 5,317,486. Thus, any subsequent misalignment of the reflector 26 in the vertical plane will be reflected in movement of the ball 38 from the zero position.

Referring now particularly to FIGS. 3–5, in the illustrated embodiment, the housing 34,40 is adjustably secured on a retaining clip 46 preferably fabricated from elastically deformable metallic material, for example, a stainless steel stamping. In the illustrated embodiment, the clip 46 has a frame portion generally designated 48 from which a centrally located platform portion 50 is struck out but pivotally hinged along connecting portion 52. The platform portion 50 has spaced slots 54 and 56 which receive corresponding locking tabs 58 and 60 on the lower housing 34 which secure it to the platform 50. The clip frame portion 48 has a pair of bent, spring portions 62 which straddle the platform 50 and resiliently wedged under the spaced, corresponding mounting arms 64 of the supporting headlamp bracket 24 when the indicator device 22 is mounted in the sliding motion thereon in a manner more fully described in the aforementioned U.S. Pat. No. 5,140,503. Obviously, other types of mounting arrangements for the housing 34,40 could be devised, other than the retaining clip 46, which has been disclosed as a preferred embodiment.

Referring now particularly to FIGS. 3 and 4, the lower housings portion 34 has an end extension 66 through which a threaded aperture 68 receives a threaded screw 70 of an adjusting device or screw, with a driver head 72 in the form of a socket. As best shown in FIG. 4, the lower end 74 of the adjusting screw 70 bears against the clip frame 48 which is anchored on the headlamp support bracket as shown in FIG. 1. Turning the screw 70 through threaded aperture 68 either pivotally raises or lowers the housing 34,40 hinged platform portion 50 of the clip 46 relative to the frame portion 48 so that when the initial headlamp aiming adjustment has been completed, the screw 70 can be turned to calibrate the indicated device 22 to raise or lower the platform 50 and the housing 34,40 until the curved inclination of the track 36 gravitationally brings the ball 38 into alignment with the Zero indicia 44, as shown in FIG. 2. Thereafter, any vibrational misalignment of the headlamp aim which produces consequent displacement of the ball 38 along the track toward one of the graduations 42 can be easily corrected by readjusting the headlamp orientation (using headlamp adjusting mechanism not shown) until the indicator 22 once again indicates return of the ball 38 into alignment with the Zero indicia 44 which thus confirms that the readjustment of the headlamp orientation to the correctly calibrated aim has been precisely performed and assured by the visible indication upon the device 22.

Referring now to FIGS. 4 and 5, in the illustrated embodiment, the upper housing portion 40 of the indicator device 22 has a downwardly projecting central rib 76 and lower surface thereof 78 which has longitudinal curvature which conforms to or compliments the longitudinal curvature of the track 36. The conforming curvatures of rib surface 78 and track 36 accordingly produce a uniform spacing A, for example, of approximately 0.1 mm between the ball 38 and the overlying rib surface 78 throughout the path of the ball 38 along track 36 so that road vibrations of the operating vehicle on which the headlamp is mounted will produce only minimal vertical impact of the ball against the lower rib surface 78 to eliminate any rattling audible to the vehicle passengers which may be even further suppressed by fabricating the ball 38 from hard dense rubber or other suitable material. Additionally, any impacts of the ball against the housing end walls 43,43 may be cushioned by providing impact-absorbing pads 80 thereon, if desired. As an additional matter, the spacing between the ball 38 and the transversely curved side walls 39 will also be held to a minimum, sufficient to allow for free rolling of the ball 38, but not so large as to permit horizontal impacting of the ball against the vertical walls 39 and 41 to produce a noticeable rattle. The clearance between the ball 38 and the side walls 39 of lower housing portion 34 and the side walls 41 of the upper housing portion have been exaggerated in FIG. 5 for illustrative purposes. Preferably a clearance on the order of 0.1 mm is provided between the ball surface and each side wall. Additionally, the ball could be releasably held captive during normal periods when inspection and monitoring of the indicator to readjust the headlamp aiming is not being performed, such as by employing a hinged door or a spring loaded retainer projecting from any of the housing walls to releasably prevent the ball from rolling.

The employment of the roller member or ball in an indicator device according to the present invention eliminates the use of mineral spirit required in conventional spirit filled bubble levels, so that flammability and fluid handling and disposal operations are avoided.

While particular embodiments of the invention have been described herein, it will be obvious to those skilled in the art that changes and modifications in various aspects may be made without departing from the broad scope of the invention. Consequently, the scope of the invention is not limited by any particular embodiment but is defined by the appended claims and the equivalents thereof.

The invention claimed is:

1. A headlamp alignment indicator assembly for indicating and calibrating a vehicle headlamp orientation comprising:

an adjustable, beam-directing structure for a headlamp;

a roller element arranged for rolling movement along a guide structure arranged to guide said rolling movement, said guide structure being disposed with exclusion of dampening liquid therefrom in order to eliminate handling and disposal hazards of said liquid;

said guide means being coupling said beam-directing structure for movement therewith; and indicator means for indicating displacement of said roller element resulting from said rolling movement relative to said guide means and further comprising at least one cushioning structure positioned to form an end of said guide track in order to absorb impact of said roller member thereagainst.

2. An indicator device for particular use in indicating and calibrating a headlamp orientation on a vehicle, comprising a roller element arranged for rolling movement relative to a guide track having a curved support surface for guiding said rolling movement thereon, said guide track being disposed with exclusion of dampening fluid therefrom in order to eliminate handling and disposal hazards of such liquid; indicator means for indicating displacement of said roller element resulting from said rolling movement relative to said guide track; further comprising at least one cushioning structure positioned to form an end of said guide track in order to absorb impact of said roller member thereagainst.

3. An indicator device according to claim 2 coupled to a beam-directing structure for a headlamp.

4. An indicator device according to claim 3, further comprising adjustment means for adjustably coupling said guide track to said beam-directing structure.

5. An indicator device according to claim 4, wherein said adjustment means comprises a mounting clip having a resiliently movable portion thereof which supports said guide means in adjustable relation to a second portion of said retaining clip mountable on said beam-directing structure.

\* \* \* \* \*

UNITED STATES PATENT AND TRADEMARK OFFICE
CERTIFICATE OF CORRECTION

PATENT NO. : 5,586,393
DATED : December 24, 1996
INVENTOR(S) : Douglas E. Pherigo and Leo B. Jansen It is certified that error appears in the above-indentified patent and that said Letters Patent is hereby corrected as shown below:

Column 4, Line 35 "being coupling" should read

-- being coupled to --

Signed and Sealed this

Twenty-ninth Day of April, 1997

Attest:

BRUCE LEHMAN

Attesting Officer

Commissioner of Patents and Trademarks